United States Patent [19]

Funazaki et al.

[11] Patent Number: 5,133,027
[45] Date of Patent: Jul. 21, 1992

[54] OPTICAL WAVEGUIDE APPARATUS FOR CONTROLLING A SIGNAL LIGHT TRAVELING THROUGH AN OPTICAL WAVEGUIDE BY MEANS OF OTHER LIGHT

[75] Inventors: Jun Funazaki; Yoshinori Ohta; Takashi Mizusaki; Hideo Adachi; Atsushi Yusa, all of Hachioji, Japan

[73] Assignee: Olympus Optical Co., Ltd., Tokyo, Japan

[21] Appl. No.: 697,402

[22] Filed: May 9, 1991

[30] Foreign Application Priority Data

May 16, 1990 [JP] Japan .................. 2-125712

[51] Int. Cl.$^5$ ................................ G02B 6/10
[52] U.S. Cl. ............................. 385/5; 385/4
[58] Field of Search ........... 350/96.13, 96.14, 354, 350/355; 359/240, 244; 385/4, 5, 8, 9, 10

[56] References Cited

U.S. PATENT DOCUMENTS 4,953,955  9/1990  Maserjian ........................ 350/354

OTHER PUBLICATIONS

Optics Letter; vol. 15, No. 1, Jan. 1, 1990, by Lewis B. Aronson & Lambertus Hesselink; "Photo refractive integrated-optical switch arrays in LiNbO$_3$" pp. 30–32.

*Primary Examiner*—John D. Lee
*Assistant Examiner*—John Ngo
*Attorney, Agent, or Firm*—Frishauf, Holtz, Goodman & Woodward

[57] ABSTRACT

An optical waveguide apparatus comprising a substrate made of material the refractive index of which is changed by an electric effect, and an optical waveguide which is formed on a portion of the substrate and allows passage of guided light. In the apparatus, the optical waveguide includes an optical path changing section for periodically producing an electromotive force under the control of one of control light and guided light.

14 Claims, 8 Drawing Sheets

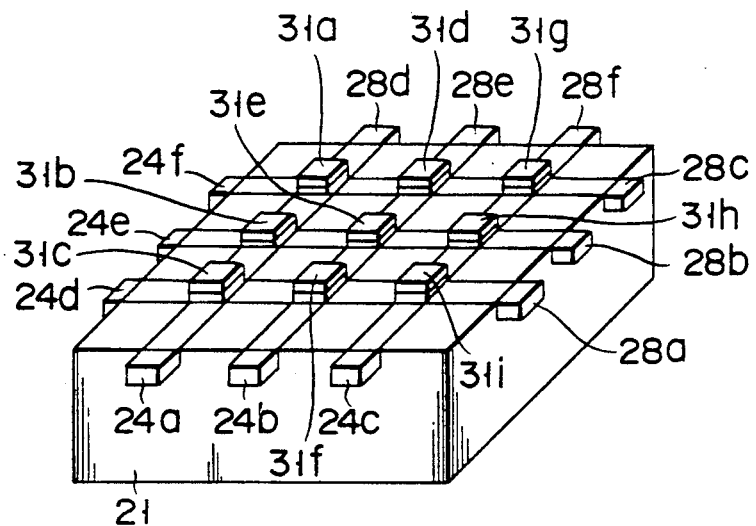
F I G. 5
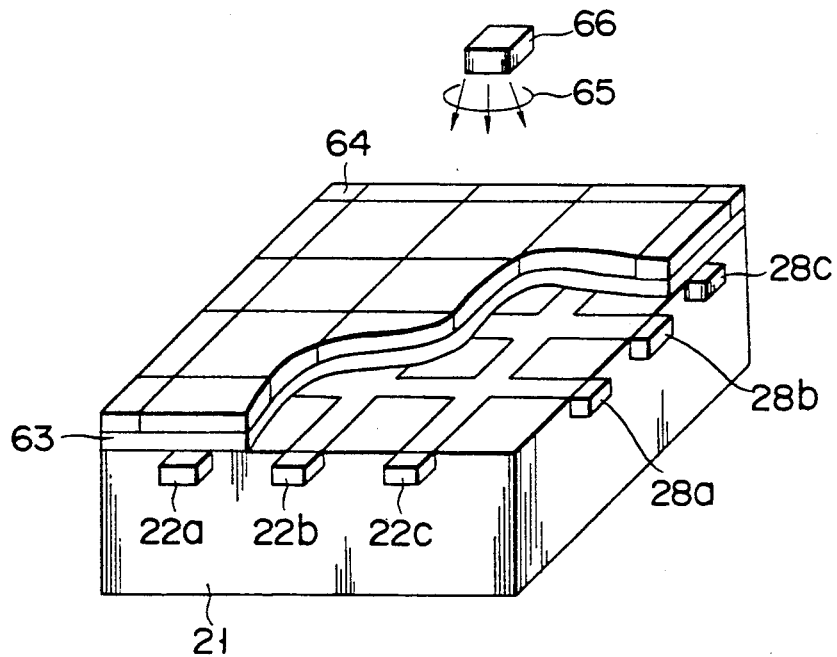
F I G. 6

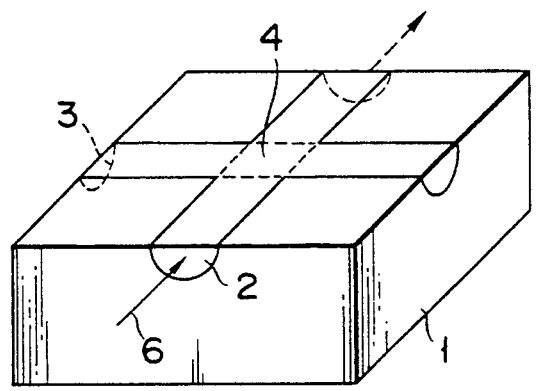
F I G. 9A
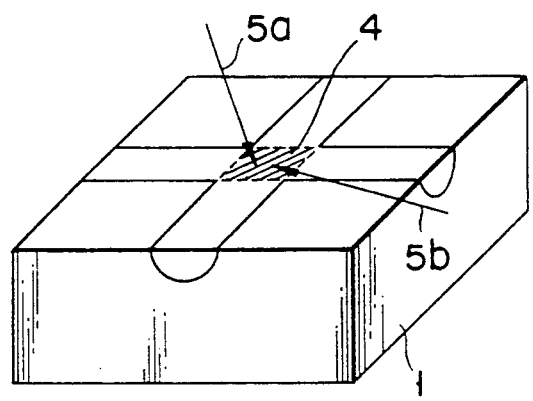
F I G. 9B
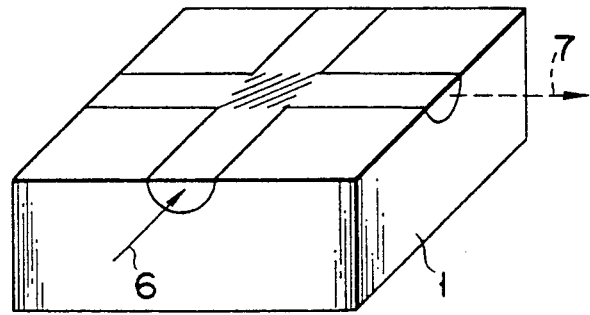
F I G. 9C

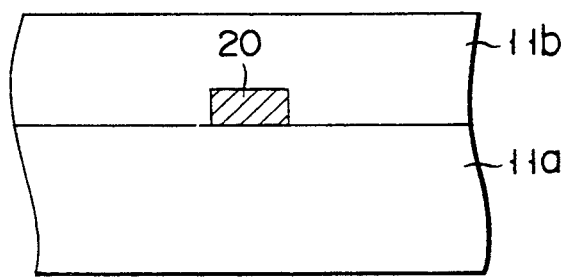
F I G. 11
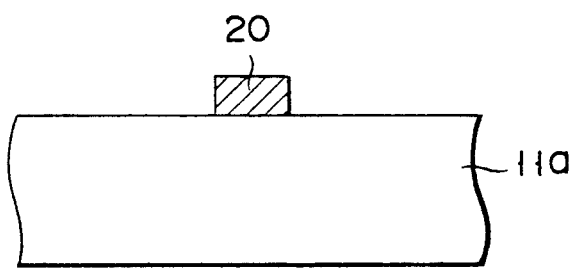
F I G. 12

OPTICAL WAVEGUIDE APPARATUS FOR CONTROLLING A SIGNAL LIGHT TRAVELING THROUGH AN OPTICAL WAVEGUIDE BY MEANS OF OTHER LIGHT

BACKGROUND OF THE INVENTION

1. Field of the Invention

This invention relates to an optical waveguide apparatus which controls signal light traveling through an optical waveguide by means of other light.

2. Description of the Related Art

In recent years, various optical integrated circuits using optical waveguides have been proposed (e.g., "OPTICS LETTERS Vol. 15 No. 1 Jan. 1, 1990. A grating element is one of elements used in an optical integrated circuit. Of grating elements, passive grating elements and functional grading elements are known. A passive grating element is incorporated in an optical waveguide, and a functional grating element is formed by utilizing an electro-optical effect, electromagnetic effect, thermal optical effect, acoustooptical effect, and the like of the material of which an optical waveguide is made. The functional grating serves as an deflector, a reflector, a wavelength filter, a connector, and a mode converter, with respect to guided light, since it has a fine cyclic structure in the order of light wavelength. The function of the passive grating is fixed, while that of the functional grating is controlled by an electrical signal, or the like.

An optical switch is known as a functional grating utilizing a photorefractive effect. FIGS. 9 (A) to (C) schematically show the functional grating, in which optical waveguides 2 and 3 are formed in a substrate 1, crossing each other. A donor-type impurity is introduced into a crossing portion 4 uniformly to generate a photorefractive effect in the portion, thereby forming an optical waveguide apparatus. As shown in FIG. 9 (A), if control light (light flux) 5a or 5b is not applied to the apparatus, a waveguide signal 6 is transmitted through the optical waveguide 2. If two coherent fluxes 5a and 5b having relatively short wavelengths and energy higher than a difference ΔE between the energy level of the donor of the crossing portion 4 and the energy level at an end of the conductive band are spatially introduced and interfere with each other in the crossing portion 4 as indicated by arrows shown in FIG. 9 (B), a grating of refractive index distribution type is generated in the portion 4 by the photorefractive effect. Further, as is shown in FIG. 9 (C), the signal light 6 transmitted through the optical waveguide 2 is diffracted by the grating generated in the crossing portion 4 by suitably changing the pitch and the direction of interference fringes formed by the applied light, and changed into a signal light 7 transmitted through the optical waveguide 3. In this way, optical switching is performed.

FIG. 10 shows an optical switch array. In the array, a plurality of optical switches shown in FIG. 5 are arranged in a matrix, and a light valve array 8 formed of liquid crystal or the like is formed on the switches. With this structure, interference light is selectively introduced into the optical switch array to operate a desired optical switch. In FIG. 10, reference numerals 6a, 6b, and 6c denote input signal light, and 7a, 7b, and 7c output signal light.

The above-mentioned passive grating performs only a specific function and cannot control guided light actively, since a cyclic structure having a diffraction function is incorporated in the optical waveguide.

In general, the functional grating actively controls guided light by means of an electrical signal supplied to an electrode formed on the optical waveguide substrate. However, if light modulated by another optical waveguide apparatus or the like is used as a control signal, or if light spatially-modulated is used as a control signal, a light signal applied to a control section must be converted to an electrical signal or the like. In addition, it is difficult to spatially introduce an electrical signal into an optical waveguide substrate.

In the optical waveguide apparatus having the above-described functional grating utilizing photo-refractive effect, if vibration is applied while interference fringes are being formed, and the interference fringes or the optical waveguide apparatus itself moves, the refractive index modulation of the grating is adversely affected, and an expected operation is not obtained. To avoid this, it is necessary to form interference fringes which are not affected by vibration or the like, resulting in an complicated structure.

SUMMARY OF THE INVENTION

An object of the invention is to provide an optical waveguide apparatus which is easily controlled by incoherent light using no electrical method, which is not affected by vibration, the structure of which is simple even if a light source of control light is incorporated in the apparatus, and elements of which can be easily integrated in a substrate.

According to the present invention, there is provided an optical waveguide apparatus comprising a substrate made of material the refractive index of which is changed by an electric effect, and an optical waveguide which is formed on a portion of the substrate and which allows passage of guided light, wherein the optical waveguide comprises an optical path changing section having for periodically producing an electromotive force under the control of one of control light and guided light.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a perspective view showing an optical switch according to a fourth example of the present invention;

FIG. 6 is a perspective view showing an optical switch according to a modification of the fourth embodiment of the present invention;

FIGS. 9A to 9C are schematic diagrams showing a functional grating utilizing a photorefractive effect;

FIG. 11 is a schematic diagram showing another optical waveguide apparatus according to the present invention;

FIG. 12 is a schematic diagram showing still another optical waveguide apparatus according to the present invention.

DETAILED DESCRIPTION OF THE PREFERRED EMBODIMENTS

Signal light traveling through the optical waveguide is refracted due to the distribution of the first impurity serving as a donor, if no control light is applied. The refractive index of the light can be uniform by doping a second impurity, which does not serve as a donor or acceptor with respect to control light, into the optical path converter or changing section in a phase opposite to that in which the concentration of the first impurity is modulated.

When control light having relatively short wavelengths and energy higher than a difference between the energy level of the first impurity serving as a donor and the energy level at an end of the energy band is applied to the optical waveguide, a grating of refractive index distribution type is generated in the optical waveguide by the photorefractive and electro-optical effect, thereby diffracting and modulating the signal light. The control light may be spatially introduced into the substrate.

The optical path changing section (hereinafter referred to as "optical path converting section") is provided in the optical waveguide, and has a periodic photovoltaic effect with respect to one of control light and waveguide light. For example, the optical path converting section may be a crossing portion of the optical waveguides crossing each other. The optical path converting section is formed by doping a first impurity serving as a donor with respect to control light or guided light, such that the concentration thereof is modulated at predetermined intervals. More specifically, the optical path converting section can be obtained in one of the following manners:

(1) If the first impurity serves as a donor for control light, a second impurity which does not serve as a donor or acceptor for the control light and the guided light is doped into the optical path converting section of the optical waveguide in a phase opposite to that in which the concentration of the first impurity is modulated.

(2) If the first impurity serves as a donor for guided light, a second impurity which does not serve as a donor or acceptor for the guided light is doped into the optical path converting section of the optical waveguide in a phase opposite to that in which the concentration of the first impurity is modulated.

It is desirable that the refractive index of the optical waveguide be 0.03 to 0.05 higher than that of the substrate, to form a structure in which light is shut and to suppress the transmission loss of the optical waveguide.

Figure 7:
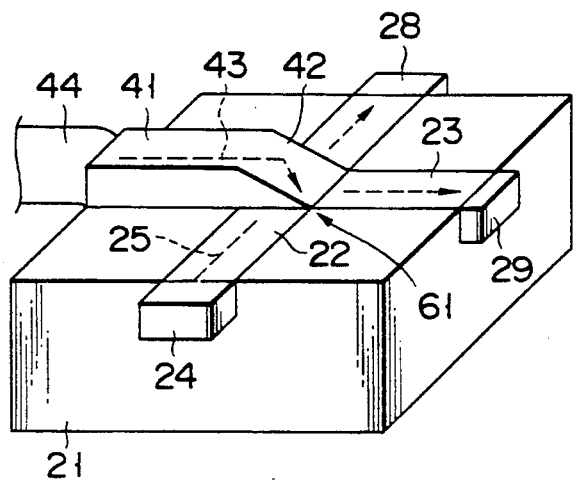
FIG. 7 is a perspective view showing an optical modulator according to a second example of the present invention.

The optical path converting section (crossing portion) may be tapered, as is shown in FIG. 7. In this structure, control light travels through a optical waveguide having a tapered portion and is applied to the crossing section located under the tapered portion. This shows that an optical system for applying control light can be formed on the same substrate on which the apparatus of the invention is formed.

The optical waveguides can be made of ferro-electrics such as lithium niobate (LiNbO$_3$) and BaTiO$_3$, paraelectrics such as BSO (Bi$_{12}$SiO$_{20}$), or compound semiconductor such as GaAs.

If the substrate is made of lithium niobate (LiNbO$_3$), the first impurity may be Fe, and the second impurity may be H$^+$. The first and second impurities can be introduced into the optical waveguide by ion injection method or thermal diffusion method.

A plurality of crossing portions may be arranged in a matrix as is shown in FIG. 5. Further, a film having a control light transmittance which can be varied by an electrical effect may be formed on the matrix as is shown in FIG. 6.

An embodiment of the optical waveguide apparatus according to the present invention will now be described with reference to FIG. 1.

Figure 2:
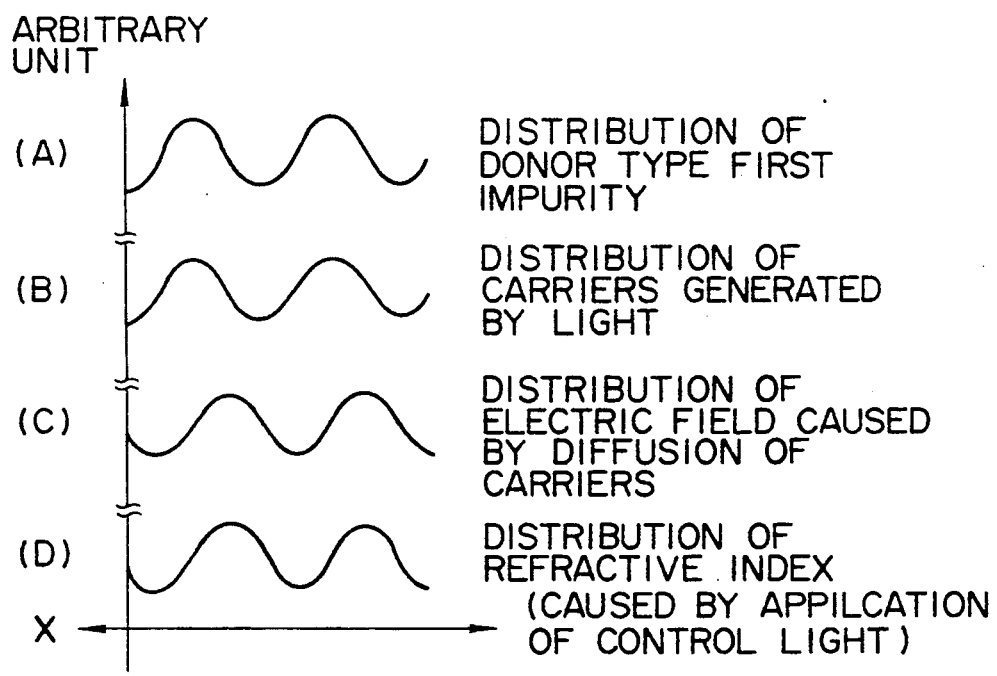
FIG. 2 is a distribution chart showing distributions of a donor-type first impurity, carriers, an electric field, and refractive index, on a cross-sectional plane X-Y of the apparatus shown in FIG. 1.

Three-dimensional optical waveguides 12 and 13 are formed on a substrate 11. A crossed clad 14, made of material having an electrical effect, is formed on the optical waveguides 12 and 13. In the clad 14, a donor-type impurity is periodically distributed as is shown in FIG. 2 (A). The clad 14 is not necessarily formed, or may be formed on the entire substrate 11.

Figure 1:
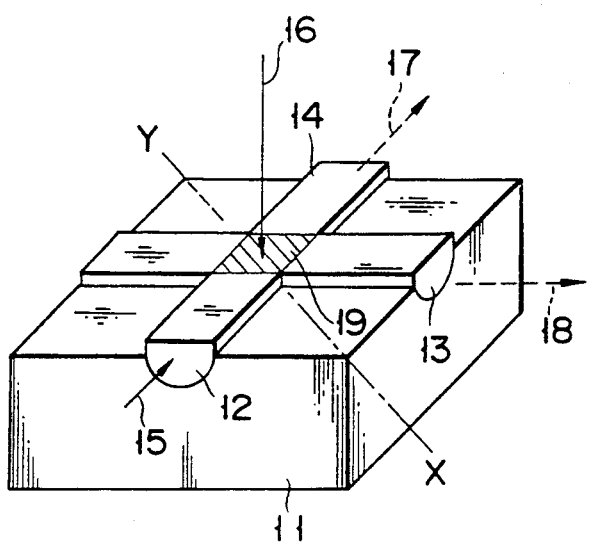
FIG. 1 is a schematic diagram showing an optical waveguide apparatus according to the present invention.

In the apparatus shown in FIG. 1, guided light 15 is transmitted through the optical waveguide 12. Control light 16 is applied to the apparatus, thereby generating a grating in the crossing section. If no control light 16 is applied, the guided light 15 passes through crossing portion 19, and output through the optical waveguide 12 as output light 17. If the control light 16 is applied, the guided light 15 is diffracted by the grating in the crossing portion 19 and output through the optical waveguide 13 as diffracted light 18.

The optical waveguides 12 and 13 cross each other at an angle θ (radian) formed between the waveguide light 15 and the diffracted light 18. Since the distribution period of the donor-type impurity is the same as the period of the grating of refractive index type generated by the control light 16 in the crossing portion 19, it is set to a value so as to satisfy the following equation:

$$\cos(\theta/2) = n\lambda/2\Lambda$$

where Λ denotes a pitch of the grating, λ a wavelength of the guided light 15, and "n" an integer number. As a result, the grating generated in the crossing portion 19 is on a condition for Bragg-diffracting the guided light 15 to the direction of the optical waveguide 13.

An optical controlling operation of the present invention will now be described.

When no control light 16 is applied to the crossing portion 19, the guided light 15 travels straight through the optical waveguide 12 and output as guided light 17, since a grating of diffractive index distribution type is not generated in the crossing portion 19. When control light 16 is applied to the crossing portion 19, a grating of diffractive index distribution type is generated in the crossing portion 19. Owing to the grating generated on the above-mentioned condition, the guided light 15 input to the optical waveguide 12 is diffracted to a direction of optical waveguide 13 and output as guided light 18.

When the application of the control light 16 to the crossing portion is ceased, the grating disappears, and the guided light 15 is not diffracted and output through the optical waveguide 12 as guided light 17. In other words, the transmission path of the guided light 15, i.e. signal light is switched from the optical waveguide 13 to the optical waveguide 12. In this manner, the direction in which the guided light 15 is transmitted is controlled by means of the control light 16.

FIGS. 2(A) to (D) show a generation principle of a grating of diffractive index distribution type in the crossing portion shown in FIG. 1. FIG. 2(A) shows the distribution of a donor-type first impurity on a cross-sectional plane X-Y in FIG. 1. FIG. 2(B) shows the distribution of carriers generated by light on the plane. FIG. 2(C) shows the distribution of an electric field generated by diffusion of the carriers on the plane. FIG. 2(D) shows the distribution of refractive index due to the electrical field.

When control light 16 is applied to the crossing portion 19, carriers are generated as shown in FIG. 2 (B) from the donor-type first impurity distributed as shown in FIG. 2(A). The carriers are redistributed by diffusion, thereby forming an electrical field having a distribution as shown in FIG. 2(C). The electrical field and the electrical optical effect of the material of the optical waveguide form a refractive index having the same distribution period as that of the donor-type first impurity, as is shown in FIG. 2(D), thereby generating a grating of refractive index distribution type.

When the application of the control light 16 is ceased, the carriers are recombined, with the result that the electrical field, the distribution of refractive index, and the grating disappear.

Figure 3:
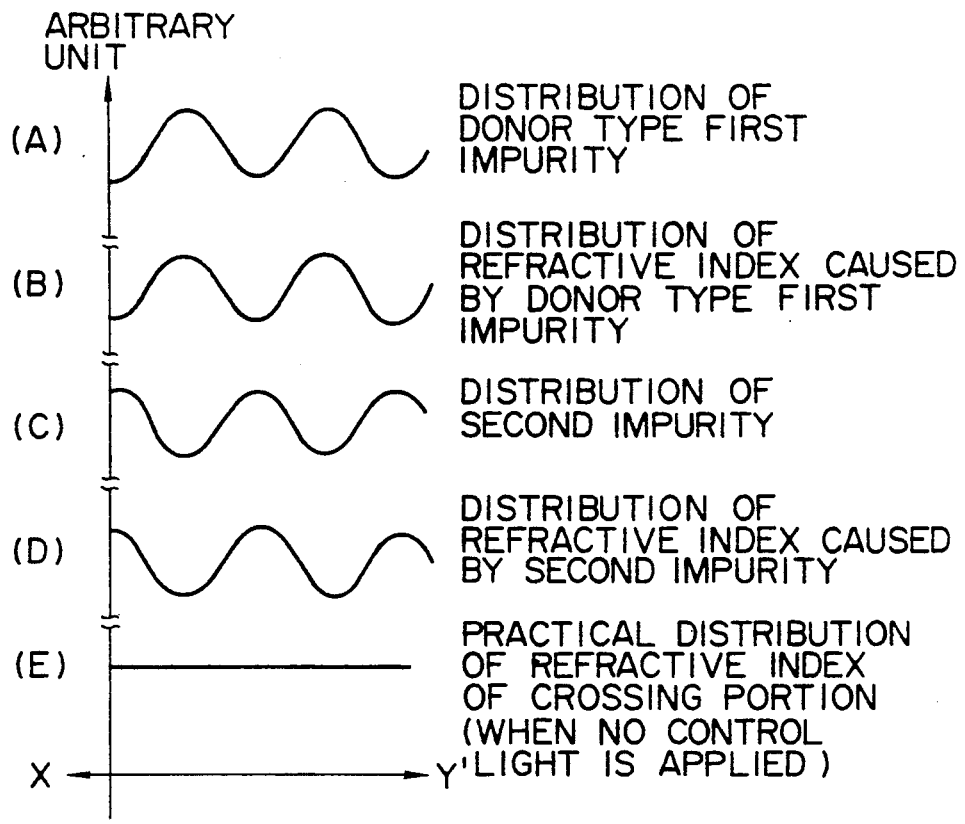
FIG. 3 is a distribution chart showing distributions of a donor-type first and second impurities, and refractive indexes thereof, on a cross-sectional plane X-Y of the apparatus shown in FIG. 1.

Even if control light 16 is not applied, the crossing portion 19 may have a refractive index associated with the guided light 15 due to the distribution of the donor-type impurity. A method for uniforming the refractive index in the crossing portion 19 will now be described with reference to FIGS. 3(A) to (E). FIG. 3(A) shows the distribution of a donor-type first impurity on a cross-sectional plane X-Y in FIG. 1. FIG. 3(B) shows the distribution of the refractive index caused by the first impurity. FIG. 3 (C) shows the distribution of a donor-type second impurity introduced for correcting the refractive index. FIG. 3(D) shows the distribution of the refractive index caused by the second impurity. FIG. 3(E) shows the synthesized distribution of the refractive indexes caused by the first and second impurities. As can be seen these distribution charts, a second impurity, which does not serve as a donor or acceptor for the control light 16 and the guided light 15, is introduced into the crossing portion 19 to a concentration distributed as shown in FIG. 3(C), thereby uniforming the refractive index of the crossing portion 19 with respect to the guided light 15. If the refractive index of the crossing portion 19 with respect to the guided light 15 differs from that of the other portions of the waveguides 12 and 13, and the difference adversely affects transmission of the guided light, the second impurity is introduced into the other portions of the waveguides 12 and 13, thereby making the refractive index of the portions equal to that of the crossing portion 19.

The distributions of the first and second impurities are not limited to those shown in FIGS. 2 and 3. The impurities can be distributed in a stepped manner, or the periods of the distributions can be changed.

The guided light 15 has a relatively long wavelength and energy of a level lower than a difference between the energy level of the donor-type first impurity and the energy level at a lower end of the conductive band, while the control light 16 has a relatively short wavelength and energy of a level higher than the difference, so that no grating of refractive index distribution type is generated in the crossing portion 19 by the guided light 15.

The optical waveguide apparatus of the invention is not limited to the structure shown in FIG. 1, but can be of that shown in FIG. 11 or 12. In the structure of FIG. 11, a core 20 is interposed between first and second substrates 11a and 11b, made of material having an electrical effect similar to that of the substrate 11. The core 20 serves as an optical waveguide having a refractive index slightly greater than those of the substrates. In the structure of FIG. 12, a second substrate is not provided and a core 20 is exposed to the atmosphere.

EXAMPLE 1

Figure 4:
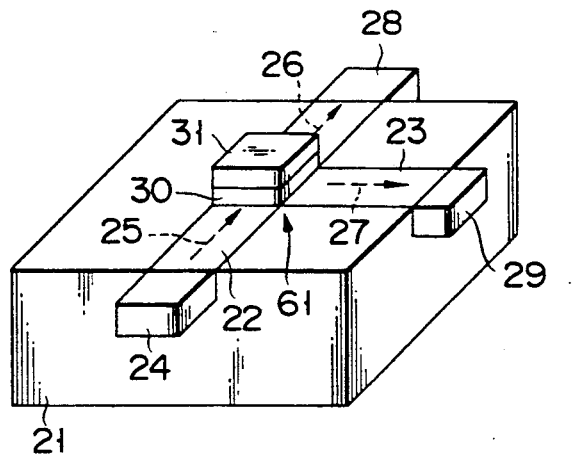
FIG. 4 is a perspective view showing an optical switch according to a first example of the present invention.

FIG. 4 shows an example of the optical switching device according to the present invention. Substrate 21 is made of lithium niobate ($LiNbO_3$). Three-dimensional optical waveguides 22 and 23, having a refractive index 0.03 to 0.05 greater than that of the substrate 21, are formed, crossing each other, in the surface region of the substrate 21, by thermally diffusing titanium patterned by lift-off method or the like on the substrate 21. First and second impurities patterned by electronic beam or the like are introduced into a crossing portion 61 of the optical waveguides 22 and 23 by thermal diffusion or the like. In this example, the first impurity is Fe and the second impurity is $H^+$. A light source 24 is attached to an end of the optical waveguide 22. The light source 24 is formed of compound semiconductor, and emits light 25, which is guided to the optical waveguide 22. Light receiving elements 28 and 29 are respectively attached to the other end of the optical waveguide 22 and an end of the optical waveguide 23, and respectively detect guided light 26 and 27 transmitted through the optical waveguides 22 and 23.

A buffer layer 30 made of $SiO_2$ having a refractive index smaller than those of the optical waveguides 22 and 23 is formed on the crossing portion 61. A light source 31 made of compound semiconductor is formed on the buffer layer 30. The buffer layer 30 may be made of any other material so long as it has a small refractive index. The light source 31 has a thickness such that it can emit light, i.e. control light, to the crossing section 61. The distribution of the donor-type first impurity introduced into the crossing portion is set to a value such that the grating of refractive index distribution type generated by control light emitted from the light source 31 has the above-mentioned condition for diffracting the guided light 25 to the optical waveguide 23.

An operation of the apparatus of the example will be described below.

When no control light is emitted from the light source 31, the signal light 25 emitted from the light source 24 is transmitted through the optical waveguide 22 to the receiving element 28, since no grating is generated in the crossing portion 61 of the optical waveguides 22 and 23 located below the light source 31. When control light is emitted from the light source 31, a grating of refraction index distribution type is generated in the crossing portion 61. As a result, the guided light 25 is diffracted by the crossing portion 61, and transmitted through the optical waveguide 23 to the receiving element 29. Thus, the optical path of the signal light can be changed by switching on or off control light.

The substrate 21 may be formed by sputtering method, using a substrate made of material other than that of the waveguides, for example, monocrystalline silicon.

In addition, clad layers having a refractive index smaller than those of the optical waveguides 22 and 23 may be formed thereon.

EXAMPLE 2

FIG. 7 shows another example of the optical switching device according to the present invention. In FIG. 7, like reference numerals are used to designate corresponding parts of those FIG. 4, and description thereof will be omitted.

A third optical waveguide 41 is formed on the optical waveguide 23 so as to introduce control light to the crossing portion 61 of the optical waveguides 22 and 23. The optical waveguide 41 is formed as follows: first, lithium niobate (LiNbO$_3$), Si$_3$N$_4$ and the like are sputtered on the substrate 21, and then patterned by lift-off method or the like. The optical waveguide 41 has, on top of the crossing portion 61, a tapered surface 42 which is processed by RIE method, so that control light 43 is applied to the crossing portion 61. Optical fiber 44 is connected to an end of the optical waveguide 41 to externally introduce control light thereto.

An operation of the apparatus of the example will be described below.

Control light 43 is introduced through the optical fiber 44, and transmitted through the optical waveguide 41. Since the optical waveguide 41 is tapered at the crossing portion 61 of the optical waveguides 22 and 23, the control light 43 is applied to the crossing portion 61, thereby generating a grating of refraction index distribution type. The other operations are the same as those of Example 1. According to Example 2, control light can be externally introduced into the apparatus more easily than in Example 1.

EXAMPLE 3

Figure 8:
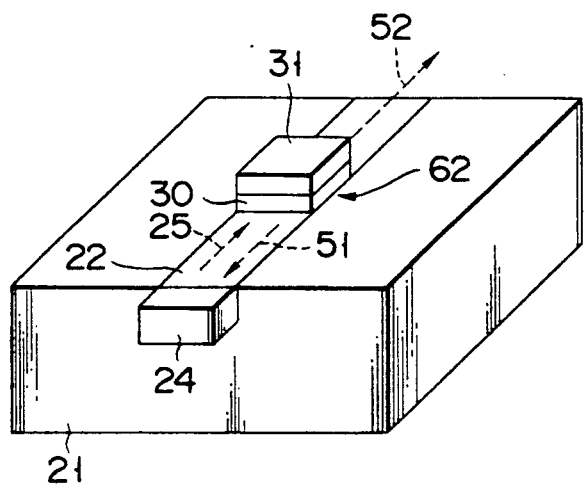
FIG. 8 is a perspective view showing an optical switch according to a third example of the present invention.
Figure 10:
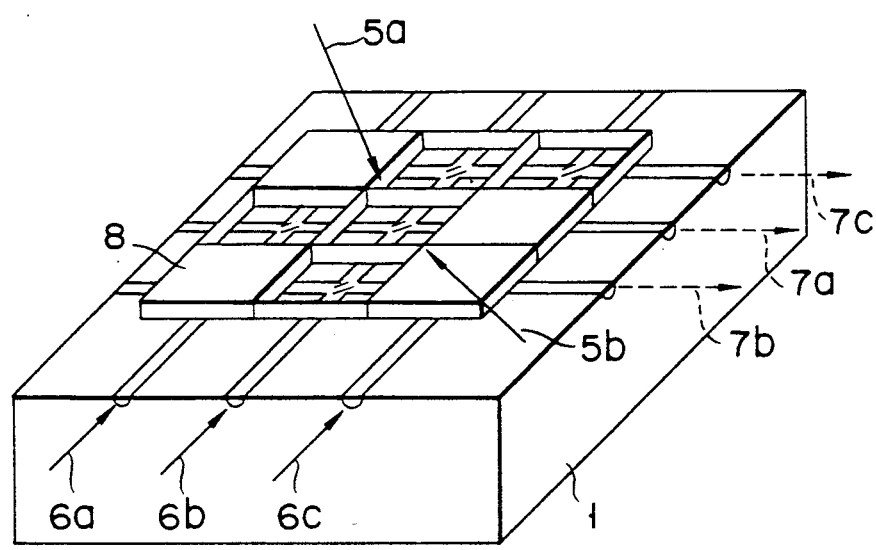
FIG. 10 is a schematic diagram showing an optical switch array.

FIG. 8 shows an example of an optical modulator according to the present invention.

In this example, a first impurity is introduced into an optical waveguide 22 to generate a grating of refractive index distribution type, which diffracts guided light 25 in an opposite direction at an optical path converting portion 62. A light source 31 is provided on the optical path converting section so as to emit control light thereto. An optical isolator may be interposed between the light source 24 and the optical waveguide 22 to make the operation of light source stable. Otherwise, guided light 25 can be introduced from an external device via optical fiber into the optical waveguide 22, without the light source 24. Control light can be spatially introduced into the light path converting section 62, or introduced through optical fiber, without the light source 31.

An operation of the optical modulator will now be described. When control light is not applied to the optical path converting portion 62, the guided light 25 transmitted from the light source 24 through the optical waveguide 22 travels straight and output as light 52, since no grating of refractive index distribution type is generated in the optical path converting section 62 under the light source 31. When control light is applied to the optical path converting section 62, since a grating of refraction index type is generated in the optical path converting section 62, the guided light 25 is diffracted at the section 62, transmitted through the waveguide 22 in the opposite direction, and output as light 51. In this case, light 52 is not output. In this manner, the guided light can be modulated by control light.

EXAMPLE 4

FIG. 5 shows an example of an optical switching array according to the present invention.

In this example, optical switching device according to Example 1 are arranged on a substrate 21 in a matrix wherein two optical waveguides of each switching device are perpendicular to each other. The switching devices are formed of the same material, and in the same manner, and has the same structure as those of the device of Example 1. Also, they can be modified in the same way as described in Example 1. Needless to say, the array need not be arranged in a 3×3 structure as shown in FIG. 5.

An operation of the optical switching array will be described below.

Each of the switching devices operates in the manner as described in Example 1. Light sources 31a to 31f, which emit control light, are selectively set in an emission mode, thereby introducing light emitted from light source 24a to 24f to desired light receiving elements 28a to 2f.

The optical switching array may be formed of a plurality of optical switching devices according to Example 2.

FIG. 6 shows a modification of Example 4, in which an external light source 66 is in place of the light source 31a to 31i of Example 4 for emitting control light. A light valve array 64, corresponding to the crossing sections of optical waveguides, is formed on top of the substrate with a buffer layer interposed therebetween. Light 65 emitted from the light source 66 is modulated by the light valve array 64 and used as control light.

EXAMPLE 5

Figure 13A:
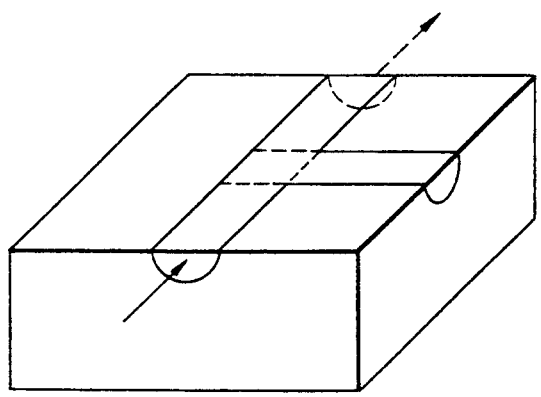
FIGS. 13A and 13B are perspective views showing a self-switching element according to the third example of the present invention.
Figure 13B:
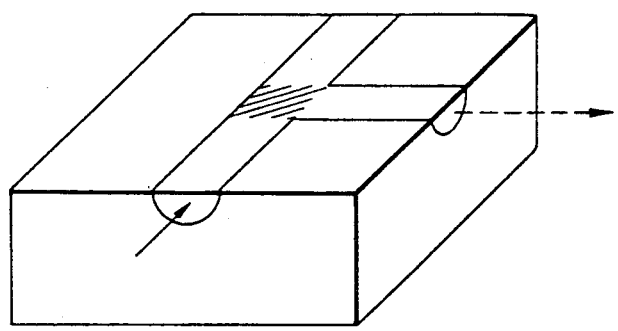

FIG. 13 shows an example of a self-switching device. In this example, a signal light 6 has energy higher than a difference between the energy level of a first impurity, which is doped into a crossing portion 61, and the energy level at an end of the conductive band. The signal light 6 travels straight through the optical waveguide 2, passing through the crossing portion 61. A grating or refractive index distribution type is generated in the crossing portion 61, a pre-determined period of time after the waveguide signal light 6 reaches the crossing portion 61. At this time, the path of the guided signal light 6 is changed, and output as a signal light 7.

In the device, a self-switching operation can be performed by changing the period in which waveguide signal light is applied. Hence, no control light is required, resulting in a simple device.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical waveguide apparatus comprising:
   a substrate made of material having a refractive index which is changed by an electric effect; and
   an optical waveguide which is formed on a portion of the substrate and which allows passage of guided light,
   wherein said optical waveguide comprises an optical path changing section for periodically producing an electromotive force under the control of one of control light and guided light.

2. An optical waveguide apparatus according to claim 1, wherein said optical path changing section is doped with a first impurity serving as a donor for one of the control light and the guided light, so that the impurity concentration of the optical path changing section varies at predetermined intervals.

3. An optical waveguide apparatus according to claim 2, wherein the first impurity serves as a donor for the control light, and a second impurity which does not serve as a donor or acceptor for the control light and the guided light is doped into the optical path changing section in a phase opposite to that in which the concentration of the first impurity is varied.

4. An optical waveguide apparatus according to claim 2, wherein the first impurity serves as a donor for the guided light, and a second impurity which does not serve as a donor or acceptor for the guided light is doped into the optical path changing section in a phase opposite to that in which the concentration of the first impurity is varied.

5. An optical waveguide apparatus according to claim 2, wherein the control light has an energy higher than the difference between the energy level of the first impurity and the energy level of a lower end of a conductor in an energy band of the material of said optical path changing section.

6. An optical waveguide apparatus according to claim 1, wherein the diffractive index of said optical waveguide is 0.03 to 0.05 higher than that of said substrate.

7. An optical waveguide apparatus according to claim 1, wherein said optical path changing section has a tapered surface.

8. An optical waveguide apparatus according to claim 1, wherein a first impurity is doped into said optical path changing section, so that a direction of the guiding light is changed to an opposite direction at said optical path changing section.

9. An optical waveguide apparatus according to claim 1, comprising a plurality of said optical path changing sections arranged in a matrix on the substrate.

10. An optical waveguide apparatus according to claim 1, wherein said optical path changing section is made of at least one material selected from the group consisting of ferroelectrics, paraelectrics, or compound semiconductor.

11. An optical waveguide apparatus according to claim 2, wherein said first impurity is Fe.

12. An optical waveguide apparatus according to claim 3, wherein said second inpurity is $H+$.

13. An optical waveguide apparatus according to claim 3, wherein said first impurity is Fe.

14. An optical waveguide apparatus according to claim 13, wherein said second inpurity is $H+$.

* * * * *